Sept. 7, 1926.

E. S. DEVLIN 1,599,321

COOKING ACCESSORY

Filed Jan. 20, 1926

Fig. 1.

Fig. 2.

WITNESSES

INVENTOR
Eugene S. Devlin
BY
ATTORNEYS

Patented Sept. 7, 1926.

1,599,321

UNITED STATES PATENT OFFICE.

EUGENE S. DEVLIN, OF NEW YORK, N. Y.

COOKING ACCESSORY.

Application filed January 20, 1926. Serial No. 82,514.

This invention relates to cooking utensils, and has particular reference to an accessory for use in connection with cooking utensils to afford means for supporting solid food stuffs above the bottom of a utensil for the purpose of precluding burning of the food stuff especially in event of the water or liquid boiling away.

The invention furthermore comprehends an accessory for cooking utensils which permits of the cooking of food stuffs by a steaming process, whereby to minimize the loss of soluble food stuffs and flavors, thereby retaining more of the natural nutriment and flavor.

As a still further object, the invention aims to provide an accessory of the character set forth which is radially adjustable to increase or decrease its diameter in accordance with the size of the utensil with which it is used and to the use to which it is to be put.

Other objects reside in an accessory which is comparatively simple in its construction and mode of use, which is inexpensive to manufacture, and which is highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a sectional view taken approximately on the line 1—1 of Fig. 2, through an accessory constructed in accordance with the invention and illustrating the same positioned within a utensil, and Fig. 2 is a plan view of the accessory removed.

Referring to the drawing by characters of reference, the accessory consists of a resilient strip of material, such as wire, which is formed into a flat spiral 10, the inner end of which is bent downwardly to form a central supporting foot 11. A plurality of circumferentially spaced downwardly offset portions 12 are provided in certain of the convolutions to constitute supporting feet whereby the flat spiral body 10 when positioned within a cooking utensil 13 as illustrated in Fig. 1, will be positioned or spaced above the bottom 14 of the utensil. In order to provide means for effecting radial contraction and expansion of the spiral body 10, whereby to increase or decrease its diameter in accordance with the use to which it is put, the outer free end of the strip of material is provided with an inwardly bent terminal 15 of general "eye" formation and embracing the next adjacent convolution. Said convolution is in turn provided with receiving notches 16 and 17 of substantially ratchet shape formation, the former notches being disposed in an opposed relation to the latter for a purpose to be hereafter set forth. The notches may be formed in any suitable manner such as by offsetting the convolutions as illustrated. When engaged in the notches 16 to radially contract the device to a normal position, it is obvious that the ratchet shape will face in a direction to maintain the outer convolutions expanded. The tendency of the free end 15 to move radially outwardly will, of course, constantly effect the entrance and engagement of the terminal 15 in the ratchet-shaped notches.

In use of the device when placed within a cooking utensil, it is obvious that the solid food stuffs will be supported and spaced above the bottom 14 of the utensil so that burning thereof by contact with the bottom is precluded. It is further obvious that in event of boiling away of the water or liquid, burning of the food stuffs or utensil is eliminated.

It is also a purpose of the invention to employ the device as a means for supporting food stuffs above a water level so that the same will be cooked by a steaming process.

What is claimed is:—

1. A cooking utensil, comprising a flat spiral element having depending supporting feet and adapted to be arranged within a cooking utensil to support solid food stuffs above the bottom of said utensil, the convolutions of said element being radially contractable and expansible for increasing and decreasing its diameter, and means for retaining said element in expanded and contracted condition.

2. A cooking accessory, comprising an element adapted to be arranged within a cooking utensil for supporting solid food stuffs above the bottom thereof, said element consisting of a resilient strip of material formed into a flat spiral, the inner end thereof being bent downwardly to form a central supporting foot, circumferentially spaced downwardly offset portions in certain of the convolutions thereof constituting supporting feet, and interengaging means on the free end of the outer convolution and on the next adjacent convolution for holding the device in radially expanding and contracting positions to increase and decrease its diameter.

3. A cooking accessory, comprising an element adapted to be arranged within a cooking utensil for supporting solid food stuffs above the bottom thereof, said element consisting of a resilient strip of material formed into a flat spiral, the inner end thereof being bent downwardly to form a central supporting foot, circumferentially spaced downwardly offset portions in certain of the convolutions thereof constituting supporting feet, and interengaging means on the free end of the outer convolution and on the next adjacent convolution for holding the device in radially expanding and contracting positions to increase and decrease its diameter, said means consisting of an inwardly-bent eye on the free end of the outer convolution and ratchet-shaped notches on the inner periphery of the next adjacent convolution.

4. A cooking accessory, comprising an element adapted to be arranged within a cooking utensil for supporting solid food stuffs above the bottom thereof, said element consisting of a resilient strip of material formed into a flat spiral, the inner end thereof being bent downwardly to form a central supporting foot, circumferentially spaced downwardly offset portions in certain of the convolutions thereof constituting supporting feet, and interengaging means on the free end of the outer convolution and on the next adjacent convolution for holding the device in radially expanding and contracting positions to increase and decrease its diameter, said means consisting of an inwardly-bent eye on the free end of the outer convolution and ratchet-shaped notches on the inner periphery of the next adjacent convolution, said ratchet-shaped notches consisting of sets disposed in opposite relation.

EUGENE S. DEVLIN.